(12) United States Patent
Tran et al.

(10) Patent No.: US 11,966,354 B1
(45) Date of Patent: Apr. 23, 2024

(54) SPREAD SPECTRUM CLOCKING FOR SENSOR INTERFACE

(71) Applicant: Aeonsemi, Inc., Grand Cayman (KY)

(72) Inventors: Ky-Anh Tran, Milpitas, CA (US); Yunteng Huang, Palo Alto, CA (US); Tao Mai, Santa Clara, CA (US)

(73) Assignee: Aeonsemi, Inc., Grand Cayman (KY)

( * ) Notice: Subject to any disclaimer, the term of this patent is extended or adjusted under 35 U.S.C. 154(b) by 14 days.

(21) Appl. No.: 17/980,834

(22) Filed: Nov. 4, 2022

(51) Int. Cl.
*G06F 13/42* (2006.01)
*G06F 1/04* (2006.01)

(52) U.S. Cl.
CPC .......... *G06F 13/4291* (2013.01); *G06F 1/04* (2013.01)

(58) Field of Classification Search
CPC ................ G06F 13/4291; G06F 1/04
See application file for complete search history.

(56) References Cited

U.S. PATENT DOCUMENTS

| | | | | |
|---|---|---|---|---|
| 6,687,319 | B1* | 2/2004 | Perino | H04B 1/707 375/141 |
| 7,434,083 | B1* | 10/2008 | Wilson | G06F 1/08 713/600 |
| 10,958,413 | B2* | 3/2021 | Li | H04L 25/03057 |
| 2017/0366468 | A1* | 12/2017 | Shoor | G06F 13/40 |
| 2022/0021412 | A1* | 1/2022 | Iwai | H04B 1/7073 |

\* cited by examiner

*Primary Examiner* — Henry Tsai
*Assistant Examiner* — Harry Z Wang
(74) *Attorney, Agent, or Firm* — Paradice & Li LLP

(57) ABSTRACT

Methods and apparatus for processing signals captured by one or more sensors are disclosed. An example method includes receiving a first signal from a control circuit, the first signal including control data associated with the one or more sensors, recovering a fixed frequency clock signal and a control signal from the first signal, generating a spread spectrum clock signal based on the fixed frequency clock signal, receiving a sensor data signal based at least in part on data captured by the one or more sensors, the spread spectrum clock signal, and the control signal, retiming the sensor data signal based at least in part on the spread spectrum clock signal and the fixed frequency clock signal, and generating an output signal based on the retimed sensor data signal.

20 Claims, 5 Drawing Sheets

SPREAD SPECTRUM CLOCKING FOR SENSOR INTERFACE

TECHNICAL FIELD

Aspects of the present disclosure relate generally to the processing of sensor data, and more particularly to improving the efficiency and electromagnetic emissions of circuits for processing such sensor data.

BACKGROUND

In a number of applications involving the capture and processing of sensor data, it may be important to limit the electromagnetic emissions of the system capturing and processing such data. For example, in a number of automotive sensors, electromagnetic emissions are stringent, for example to prevent interference with other electronic systems, such as global positioning system (GPS) receivers. Further, due to space and cost constraints, such sensor systems are desired to have as few components as necessary.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

Systems and methods for processing signals received from one or more sensors are disclosed. One innovative aspect of the subject matter described in this disclosure can be implemented as a spread spectrum serializer circuit. The spread spectrum serializer circuit may include a first terminal to receive a first signal from a control circuit and to transmit an output signal to the control circuit, a clock and control signal recovery circuit to recover a control signal and a fixed frequency clock signal from the first signal, a spread spectrum clock generation circuit to generate a spread spectrum clock signal based on the fixed frequency clock signal, a second terminal to receive a sensor data signal from a sensor data processing circuit, the sensor data signal generated based at least in part on the spread spectrum clock signal, the control signal, and data generated by one or more sensors coupled to the sensor data processing circuit, a retiming circuit to generate a retimed sensor data signal based at least in part on the sensor data signal and the fixed frequency clock signal, and an output data generations circuit to generate the output signal based at least in part on the retimed sensor data signal.

In some aspects, the spread spectrum clock signal has a bounded phase drift. In some aspects, a frequency of the spread spectrum clock signal follows a triangular waveform. In some aspects, a frequency of the spread spectrum clock varies by at least a threshold rate.

In some aspects, the retiming circuit includes a first in first out (FIFO) data buffer.

In some aspects, the one or more sensors include one or more image sensors, and the sensor data signal includes image data captured by the one or more image sensors. In some aspects, the retiming circuit generates the retimed sensor data signal based at least in part on a pixel clock signal received from the sensor data processing circuit.

In some aspects, the retiming circuit is further configured to generate a recovered clock signal from the sensor data signal and to generate the retimed sensor data signal based at least in part on the recovered clock signal.

In some aspects, the retimed sensor data signal is a parallel formatted data signal, and the output signal is a serial formatted data signal.

Another innovative aspect of the subject matter described in this disclosure can be implemented as a method for processing signals received from one or more sensors. In some implementations, the method includes receiving a first signal from a control circuit, the first signal including control data associated with the one or more sensors, recovering a fixed frequency clock signal and a control signal from the first signal, generating a spread spectrum clock signal based on the fixed frequency clock signal, receiving a sensor data signal based at least in part on data captured by the one or more sensors, the spread spectrum clock signal, and the control signal, retiming the sensor data signal based at least in part on the spread spectrum clock signal and the fixed frequency clock signal, and generating an output signal based on the retimed sensor data signal.

In some aspects, the spread spectrum clock signal has a bounded phase drift. In some aspects, a frequency of the spread spectrum clock signal follows a triangular or a sawtooth waveform. In some aspects, a frequency of the spread spectrum clock signal varies by at least a threshold rate.

In some aspects, retiming the sensor data signal includes retiming the sensor data signal using a first in first out (FIFO) data buffer.

In some aspects, the one or more sensors include one or more image sensors, and the sensor data includes image data captured by the one or more image sensors. In some aspects, the sensor data signal is received from a sensor data processing circuit and retiming the sensor data signal includes receiving a pixel clock signal from the sensor data processing circuit and retiming the sensor data signal based at least in part on the pixel clock signal.

In some aspects, retiming the sensor data signal includes generating a recovered clock signal from the sensor data signal, and generating the retimed sensor data signal based at least in part on the recovered clock signal.

In some aspects, the retimed data signal is a parallel formatted data signal, and the output signal is a serial formatted data signal.

Another innovative aspect of the subject matter described in this disclosure can be implemented as a spread spectrum serializer circuit. An example echo cancelation circuit includes means for receiving a first signal from a control circuit, the first signal including control data associated with the one or more sensors, means for recovering a fixed frequency clock signal and a control signal from the first signal, means for generating a spread spectrum clock signal based on the fixed frequency clock signal, means for receiving a sensor data signal based at least in part on data captured by the one or more sensors, the spread spectrum clock signal, and the control signal, means for retiming the sensor data signal based at least in part on the spread spectrum clock signal and the fixed frequency clock signal, and means for generating an output signal based on the retimed sensor data signal.

BRIEF DESCRIPTION OF THE DRAWINGS

The example implementations described herein are illustrated by way of example and are not intended to be limited

DETAILED DESCRIPTION

Aspects of the present disclosure may be used to efficiently reduce electromagnetic emissions of a sensor system. In some implementations, the electromagnetic emissions may be reduced through the use of a spread spectrum clock signal for clocking portions of a sensor board in order to reduce electromagnetic emissions due to clock spurs and harmonics of a fixed frequency clock signal. A sensor chip of the sensor board may not require a frequency reference but may instead be synchronized to references in a control signal provided to the sensor chip. In some aspects, the sensor chip may require that the spread spectrum clock have a bounded phase drift, such that the amount of frequency spreading in the spread spectrum clock is deterministic and bounded over time. In some aspects, this spread spectrum clock signal may have a frequency which corresponds to a triangular waveform or a sawtooth waveform. A serializer circuit may receive a sensor data signal from the sensor chip and retime and serialized the sensor data signal based on the spread spectrum clock and the fixed frequency clock. The serialized and retimed signal may then be output from the sensor board. These and more details of the present disclosure are described in more detail below.

In the following description, numerous specific details are set forth such as examples of specific components, circuits, and processes to provide a thorough understanding of the present disclosure. The term "coupled" as used herein means coupled directly to or coupled through one or more intervening components or circuits. Also, in the following description and for purposes of explanation, specific nomenclature and/or details are set forth to provide a thorough understanding of the example implementations. However, it will be apparent to one skilled in the art that these specific details may not be required to practice the example implementations. In other instances, well-known circuits and devices are shown in block diagram form to avoid obscuring the present disclosure. Any of the signals provided over various buses described herein may be time-multiplexed with other signals and provided over one or more common buses. Additionally, the interconnection between circuit elements or software blocks may be shown as buses or as single signal lines. Each of the buses may alternatively be a single signal line, and each of the single signal lines may alternatively be buses, and a single line or bus might represent any one or more of a myriad of physical or logical mechanisms for communication between components. The example implementations are not to be construed as limited to specific examples described herein but rather to include within their scope all implementations defined by the appended claims.

Figure 1:
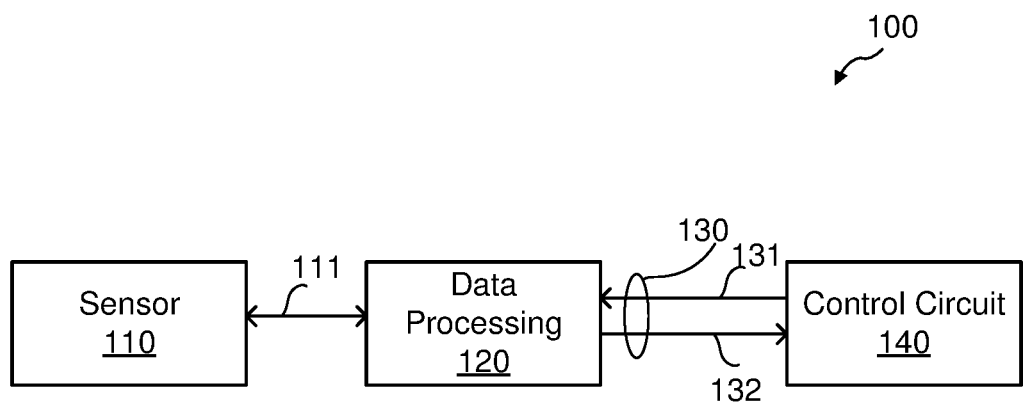
FIG. 1 shows a simplified circuit diagram of a sensor data processing system which may be used with the example implementations.

FIG. 1 shows a simplified circuit diagram of a sensor data processing system 100 which may be used with the example implementations. The sensor data processing system 100 may include one or more sensors 110 for capturing data, such as image data, audio data, and so on. The one or more sensors may receive control information and provide captured data to a data processing circuit 120 via a first connection 111. The first connection 111 may be a suitable wired or wireless connection for coupling the one or more sensors to the data processing circuit 120. The data processing circuit 120 may be coupled to a control circuit 140 via a duplex signaling medium 130. For example, the data processing circuit 120 may receive a signal 131 from the control circuit 140 and transmit a signal 132 to the control circuit via the medium 130. In some aspects, the signal 131 may include control information, one or more clock signals or other timing information, and similar. The signal 132 may include one or more signals for communicating the data captured by the one or more sensors 111. In some examples, the medium 130 may be a full duplex wireline communication medium, such as a twisted copper pair. Such a twisted copper pair may be provided, for example, in a 10 Gigabit Ethernet system operating in accordance with the 10GBASE-T, or the Institute of Electrical and Electronics Engineers (IEEE) 802.3an-2006 standard or corresponding subsequent standards from the IEEE or a similar standard from another similar standards body. In other examples, the medium 130 may be wireless. One problem which may arise with such a sensor data processing system 100 is that clock signals used for controlling the data processing circuit 120 may cause undesirable electromagnetic emissions. Such emissions may interfere with other circuitry in a number of contexts. For example, in automotive sensing systems, or other environments where other circuits are present for capturing wireless signals, such as Global Positioning System (GPS) signals, or the like, emissions due to clock spurs, clock harmonics, and similar may cause undesirable emissions. Avoidance or mitigation of such electromagnetic emissions may therefore be desirable for improved functioning of such sensor data processing systems.

Figure 2:
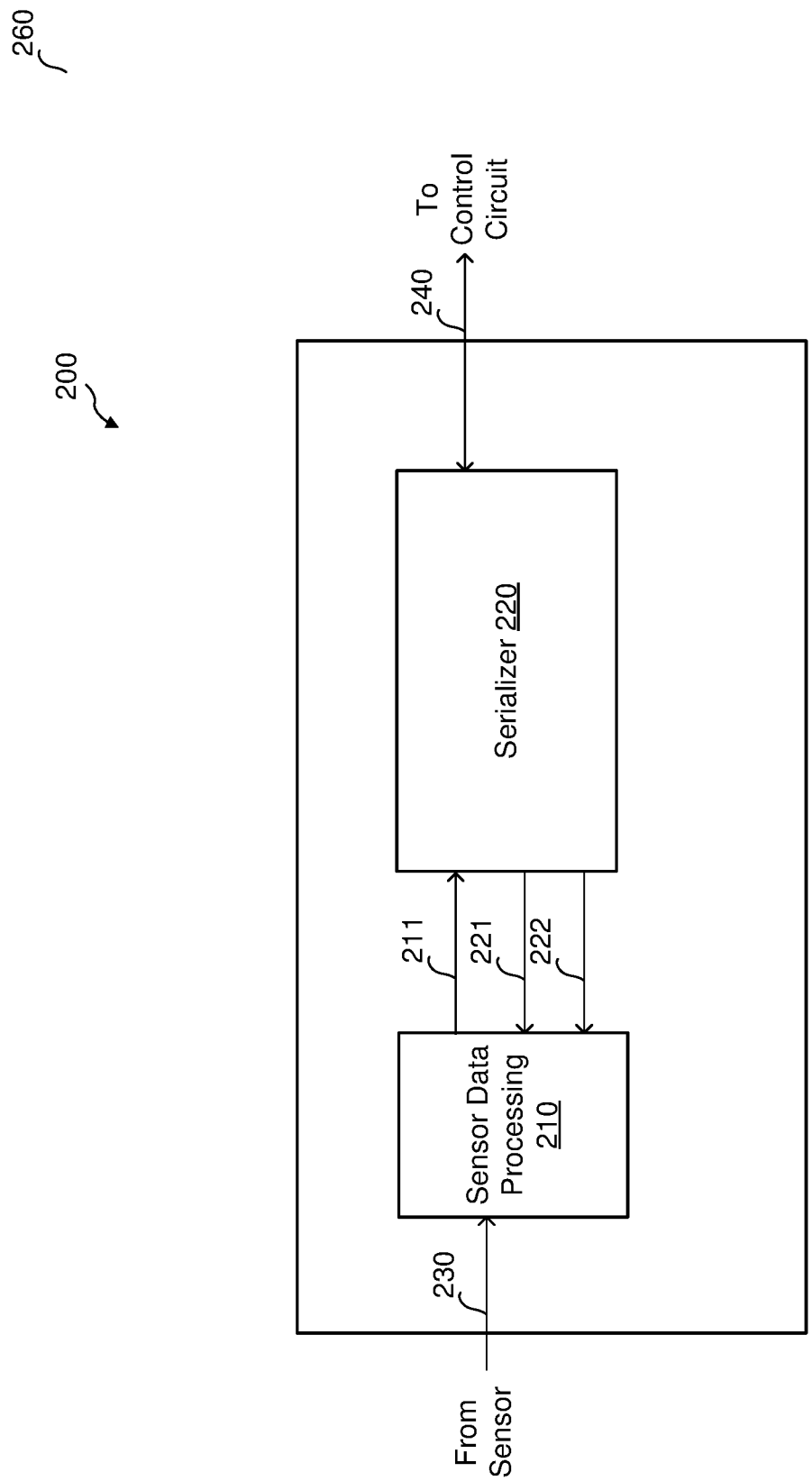
FIG. 2 shows a simplified circuit diagram of a sensor data processor, according to some implementations.

FIG. 2 shows a simplified circuit diagram of a sensor data processor 200, according to some implementations. The sensor data processor 200 may be one example of the data processing circuit 120 of FIG. 1. The sensor data processor 200 includes a sensor data processing circuit 210 and a serializer 220. The serializer 220 receives a control and timing signal from a control circuit via the medium 240, which may be one example of the medium 130 of FIG. 1. The control and timing signal may be received from a control circuit such as the control circuit 140 of FIG. 1. The serializer 220 recovers a fixed frequency clock signal and a control signal 221 from the control and timing signal 240 (not shown in FIG. 2 for simplicity). The serializer generates a spread spectrum clock signal 222 from the fixed frequency clock signal. The control signal 221 and the spread spectrum clock signal 222 are provided to the sensor data processing circuit 210. The sensor data processing circuit 210 then receives captured sensor data 230 from one or more sensors, such as the sensors 110 of FIG. 1, based at least in part on the control signal 221 and the spread spectrum clock signal 222. The sensor data processing circuit 210 then provides a sensor data signal 211 to the serializer 220. The serializer 220 generates an output signal for communication to the control circuit via the medium 240.

As discussed above, aspects of the present disclosure may reduce electromagnetic emissions associated with capturing and processing sensor data using a spread spectrum clock signal for clocking portions of a sensor board. Use of such a spread spectrum clock signal may reduce electromagnetic emissions due to clock spurs and harmonics of a fixed frequency clock signal. Such emissions reductions may be particularly desirable when a sensor data processing system is in proximity to other circuits and sensors which may be sensitive to electromagnetic emissions. For example, in automotive systems, stringent electromagnetic emissions limits may be in place in order to prevent interference with reception of GPS signals and other wireless signals. Further, the example implementations may allow for the use of such a spread spectrum clock while still providing for time-synchronization of the sensor processing with control and deserialization circuitry, for example in order to implement functionality such as time-sensitive networking.

Figure 3:
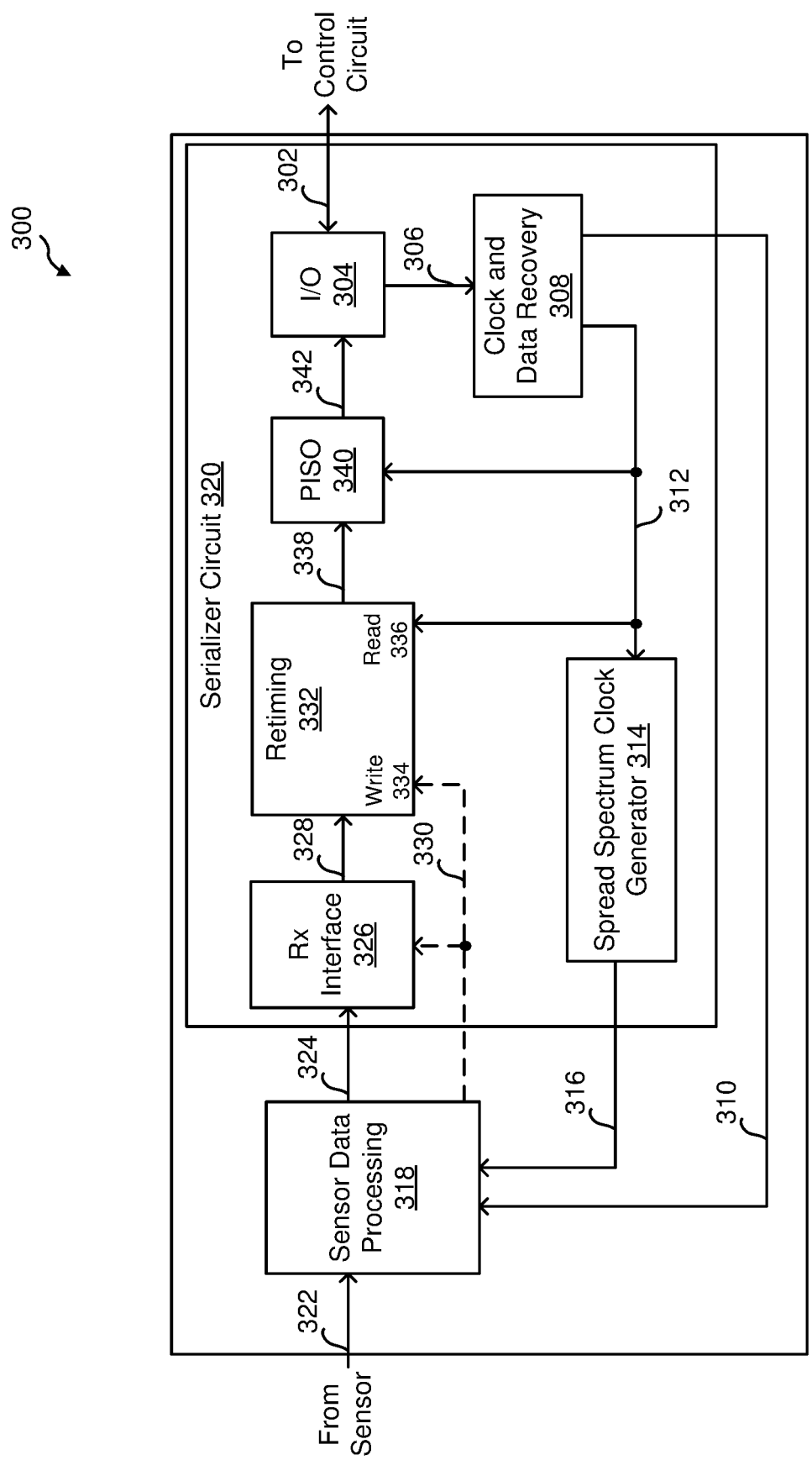
FIG. 3 is a block diagram showing one example of the sensor data processor of FIG. 2, according to some implementations.

FIG. 3 is a block diagram 300 showing one example of the sensor data processor 200 of FIG. 2, according to some implementations. The block diagram 300 depicts one example of the sensor data processor 200 in more detail. Similarly to sensor data processor 200, the block diagram 300 includes a sensor data processing circuit 318 and a serializer circuit 320. The serializer circuit 320 is coupled to a control circuit via a medium 302. More particularly, the serializer circuit 320 may receive a control and timing signal 306 from the control circuit via the medium 302 and may transmit an output data signal 340 to the control circuit via the medium 302. The medium 302 may be one example of the medium 130 of FIG. 1. The serializer circuit 320 may receive the control and timing signal 306 at input/output (I/O) module 304 and provide the control and timing signal 306 to clock and data recovery 308. In some aspects, the sensor data processor 200 does not require its own frequency reference, such as provided by a crystal oscillator (XO), a crystal (XTAL), or another frequency reference generated on the sensor data processor 200. Instead, the sensor data processor 200 may be synchronized to timing references provided by the control circuit.

Clock and data recovery 308 may generate a control signal 310 and a fixed frequency clock 312 based on the control and timing signal 306. For example, the control and timing signal 306 may include control data in accordance with an Inter-Integrated Circuit (I2C or I²C) protocol. In some aspects, such control data may be transmitted at a lower rate as compared with a fixed frequency clock signal also communicated in the control and timing signal 306. The control signal 310 may be provided to sensor data processing 318 and the fixed frequency clock 312 may be provided to spread spectrum clock generator 314. The spread spectrum clock generator 314 may generate a spread spectrum clock signal 316 based on the fixed frequency clock 312. More particularly, the spread spectrum clock signal 316 may be generated to have bounded phase drift, that is the integral of the frequency offset of the spread spectrum clock signal 316 over time is bounded. In one example, the frequency of the spread spectrum clock signal 316 may be generated to follow a triangular waveform or a sawtooth waveform, or another waveform having a deterministic phase drift over time. In some aspects, the spread spectrum clock signal 316 may be a periodic waveform having such a bounded phase drift. For example, the spread spectrum clock signal 316 may have a frequency which varies periodically according to a triangular waveform or a sawtooth waveform, such as varying periodically between a first frequency and a second frequency. For such an example, the frequency offset of the spread spectrum clock signal 316 is bounded by the difference between the first frequency and the second frequency.

The sensor data processing circuit 318 receives the control signal 310 and the spread spectrum clock signal 316, in addition to receiving sensor data 322 from one or more sensors (sensors not shown in FIG. 3 for simplicity). The one or more sensors may include any suitable sensors for capturing data, such as visual, audio, temperature, pressure, or any other suitable form of data. In some implementations, the one or more sensors may include one or more cameras or visual sensors capable of capturing images or video data. The sensor data processing circuit 318 may process the received sensor data 322 based on control data in the control signal 310. Processing the sensor data 320 may be based at least in part on the spread spectrum clock signal 316. For example, the spread spectrum clock signal 316 may function as a timing reference for processing the sensor data 322. The sensor data processing circuit 318 may process the sensor data 322, for example by filtering, smoothing, or otherwise altering the sensor data 322, by selecting a portion of the captured data to send on to the serializer circuit 320, by associating a time with one or more captured data items, and so on. For example, when the one or more sensors are image sensors, processing the sensor data 322 may include processing one or more images captured by the image sensors, performing one or more adjustments on images captured by the image sensors, adjusting a white balance, a warmness, a sharpness, a resolution, or other aspects of the images captured by the image sensors. In some aspects, when the data captured by the image sensors is video data, processing the sensor data 322 may include altering a frame rate of the captured video data, altering a format associated with the captured video data, and so on.

Because the sensor data processing circuit 318 processes the sensor data 322 based on the spread spectrum clock signal 316, rather than the fixed frequency clock signal 312, the sensor data processing circuit 318 may exhibit reduced electromagnetic emissions as compared with a similar sensor data processing circuit which processes the sensor data based on the fixed frequency clock signal 312. More particularly, a power spectral density associated with the sensor data processing circuit 318 may be reduced in amplitude and spread over a wider range of frequencies. In contrast, for the similar sensor data processing circuit, a corresponding power spectral density may exhibit increased peaks at a frequency of the fixed frequency clock signal 312 (a "clock spur") in addition to other peaks at harmonic frequencies of the fixed frequency clock signal 312. For applications requiring the minimization of electromagnetic emissions, such as automotive applications, this reduction of electromagnetic emissions may improve performance of the sensor data processor 200.

The sensor data processing circuit 318 generates a processed sensor data signal 324 based on the received sensor data 322, the control data 310, and the spread spectrum clock signal 316, and provides the processed sensor data signal 324 to a receiver interface 326 of the serializer circuitry 320. The processed sensor data signal 324 may be a parallel data signal provided to the receiver interface 326. For example, the processed sensor data signal 324 may be provided via a parallel data bus to the receiver interface 326. In some implementations, the receiver interface 326 may be omitted from the sensor data processor 200, and the sensor data processing circuit 318 may provide the processed sensor data signal 324 directly to the retiming circuit 332.

The receiver interface 326 provides a parallel signal 328 to the retiming circuit 332. The parallel signal 328 corresponds to the processed data signal 324, and in some aspects the two signals may be the same.

The receiver interface 326 sends the parallel signal 328 to the retiming circuit 332. The retiming circuit 332 may be a first-in first-out (FIFO) buffer, or another suitable circuit for retiming the parallel signal 328. The retiming circuit 332 may also receive the fixed frequency clock signal 312 from clock and data recovery 308. The retiming circuit 332 may retime the data received from the sensor data processing circuit according to the fixed frequency clock signal 312. That is, while the processed sensor data signal 324 may include sensor data expressed according to the spread spectrum clock signal 316, the retiming circuit 332 may retime such sensor data according to timing references of the fixed frequency clock signal 312. To that end, the retiming circuit receives the fixed frequency clock signal 312 as a read clock input 336. In some aspects, the processed sensor data signal 324 (and the corresponding parallel signal 328) may include timing references based on the spread spectrum clock signal 316, and these timing references may be recovered for use as a write clock input of the retiming circuit 332. In some other aspects, a clock signal 330 based on the spread spectrum clock 316 may be provided from the sensor data processing circuit 318 to a write clock input 334 of the retiming circuit 332. For example, when the one or more sensors are image sensors, the clock signal 330 may be a pixel clock signal generated based on the spread spectrum clock signal 316, such as a pixel clock signal indicating a rate at which pixels are transmitted. the retiming circuit may identify spread spectrum clock based timing references associated with each item of the captured sensor data in the processed sensor data signal 324 and determine corresponding fixed frequency clock based timing references for each item of the captured data, using the write clock input 334 and the read clock input 336. When the retiming circuit 332 includes a FIFO buffer, such retiming may include buffering each value of the captured sensor data in order of their reception. Then, a value of the fixed frequency clock signal 312 is assigned to each of the buffered values, resulting in generation of a retimed sensor data signal 338 including values of the captured sensor data, where each value of the captured sensor data is represented with respect to a corresponding value of the fixed frequency clock signal 312 rather than the spread spectrum clock signal 316.

The retiming circuit 332 sends the retimed sensor data signal 338 to the parallel-in serial-out (PISO) circuit 340. The PISO circuit 340 converts the retimed sensor data signal 338 from a parallel format into a serial format. In some aspects, the PISO circuit 340 includes one or more shift registers for converting the retimed sensor data signal 338 into a serialized data signal 342.

The serialized data signal 342 is sent to the I/O circuit 304 for output via the medium 302 to the control circuit. While not shown in FIG. 3 for simplicity, from the control circuit, the serialized data signal 342 may be further processed by the control circuit or one or more circuits coupled to the control circuit, such as by deserializing the serialized data signal 342, displaying or otherwise presenting the data captured by the one or more sensors, and so on.

Figure 4:
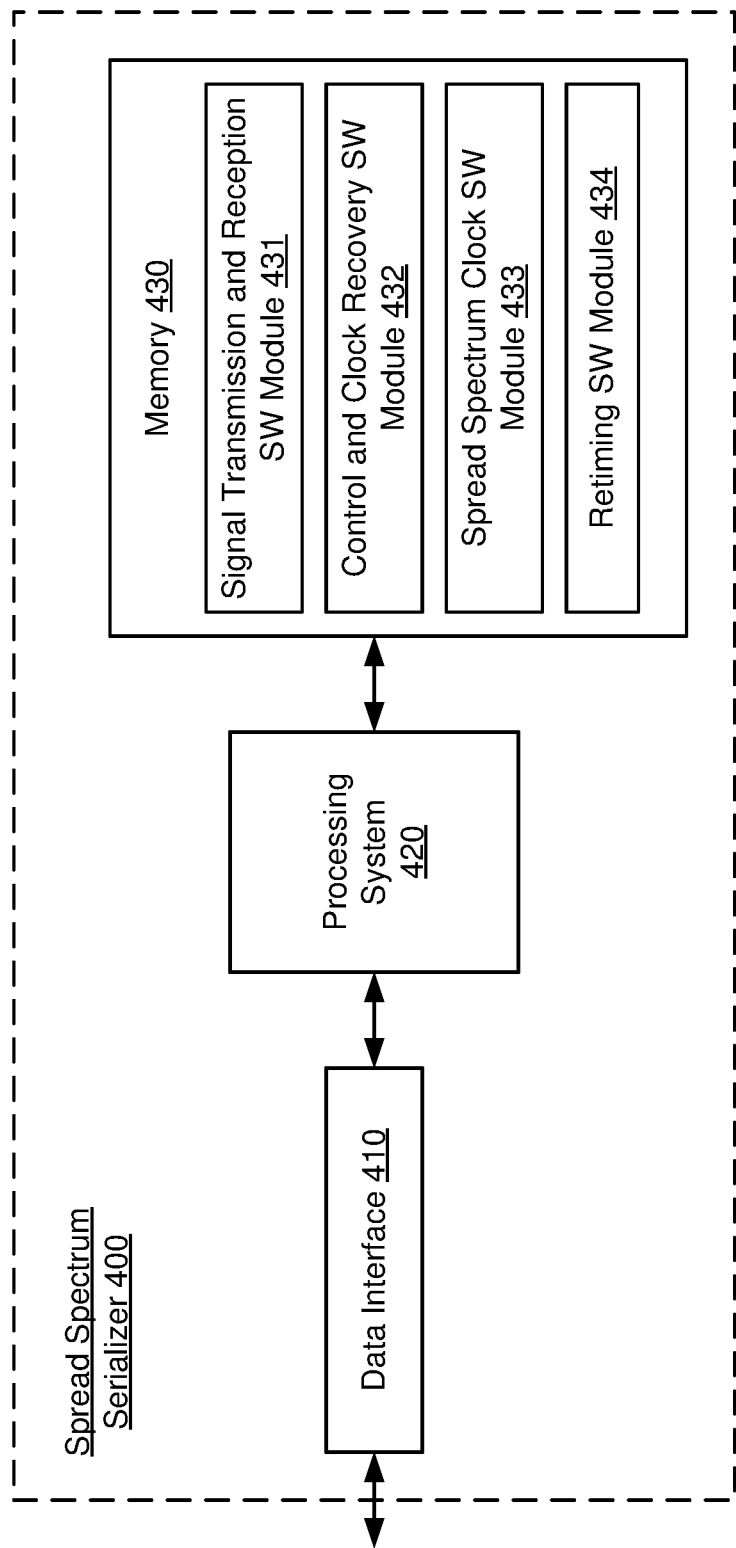
FIG. 4 shows a block diagram of a spread spectrum serializer, according to some implementations.

FIG. 4 shows a block diagram of a spread spectrum serializer 400, according to some implementations. In some implementations, the spread spectrum serializer 400 may be one example of the serializer circuit 320 of FIG. 3.

In some implementations, the spread spectrum serializer 400 may include a data interface 410, a processing system 420, and a memory 430. The data interface 410 is configured to transmit and receive signals, such as via a medium 302.

The memory 430 may include a non-transitory computer-readable medium (including one or more nonvolatile memory elements, such as EPROM, EEPROM, Flash memory, a hard drive, and the like) that may store at least the following software (SW) modules:

A signal transmission and reception SW module 431 to transmit signals from and receive signals at the spread spectrum serializer 400;
   a control and clock recovery SW module 432 to recover a fixed frequency clock signal and control signals from signals received at the spread spectrum serializer 400;
   a spread spectrum clock SW module 433 to generate a spread spectrum clock signal based on a fixed frequency clock signal recovered by the control and clock recovery SW module 432; and
   a retiming SW module 434 to receive sensor data signals from a sensor data processing circuit coupled to the spread spectrum serializer 400 and generate retimed sensor data signals based on the spread spectrum clock signals generated by the spread spectrum clock SW module 433 and the fixed frequency clock signal generated by the control and clock recovery SW module 432.

Each software module includes instructions that, when executed by the processing system 420, causes the echo canceler 500 to perform the corresponding functions.

The processing system 420 may include any suitable one or more processors capable of executing scripts or instructions of one or more software programs stored in the spread spectrum serializer 400 (such as in memory 430). For example, the processing system 420 may execute the signal transmission and reception SW module 431 to transmit signals from and receive signals at the spread spectrum serializer 400. The processing system 420 also may execute the control and clock recovery SW module 432 to recover a fixed frequency clock signal and control signals from signals received at the spread spectrum serializer 400. Further, the processing system 420 may execute the spread spectrum clock SW module 433 to generate a spread spectrum clock signal based on a fixed frequency clock signal recovered by the control and clock recovery SW module 432. Further, the processing system 420 may execute the retiming SW module 434 to receive sensor data signals from a sensor data processing circuit coupled to the spread spectrum serializer 400 and generate retimed sensor data signals based on the spread spectrum clock signals generated by the spread spectrum clock SW module 433 and the fixed frequency clock signal generated by the control and clock recovery SW module 432.

Figure 5:
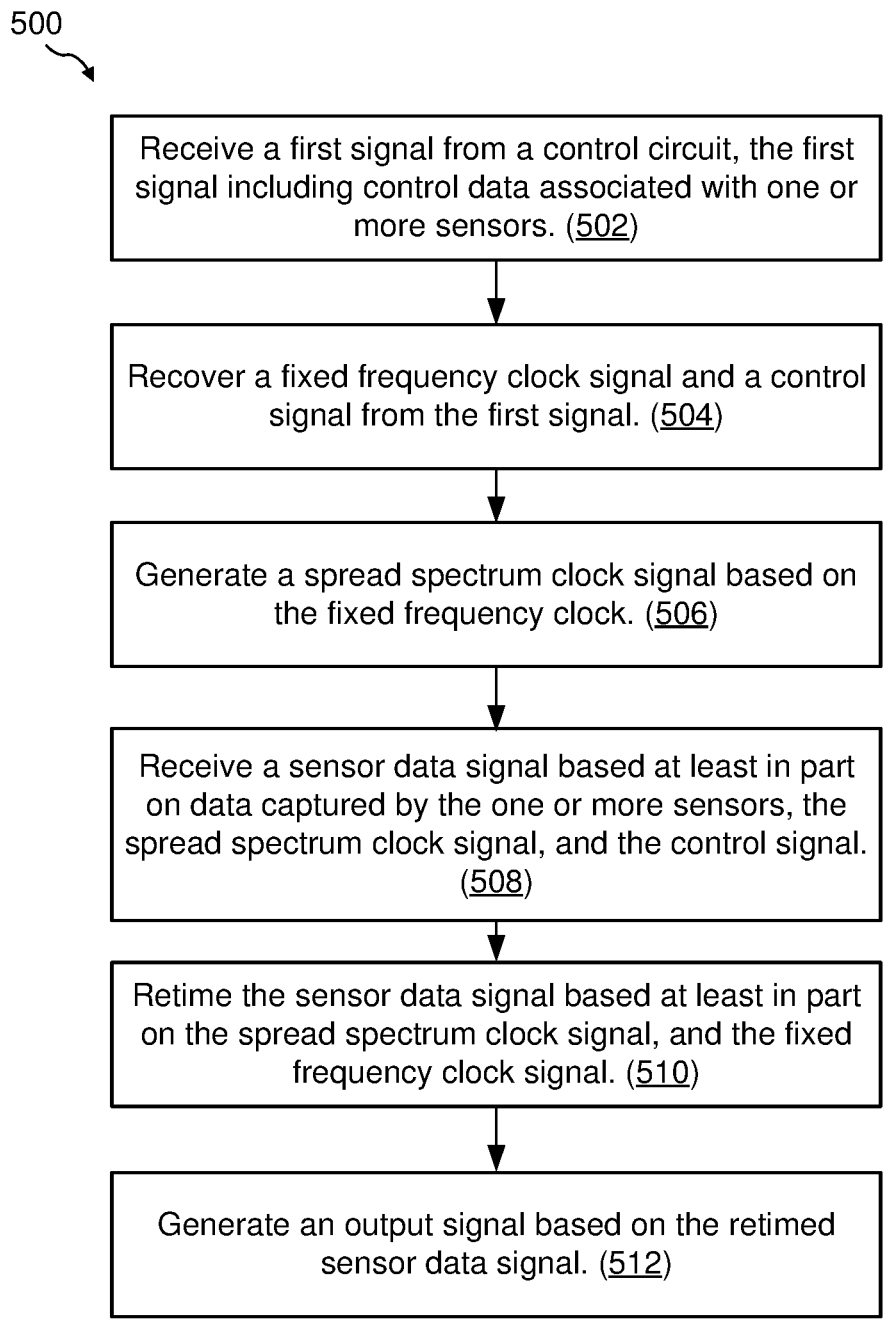
FIG. 5 shows an illustrative flowchart depicting an example operation for processing signals received from one or more sensors, according to some implementations.

FIG. 5 shows an illustrative flowchart depicting an example operation 500 for processing signals received from one or more sensors, according to some implementations. The operation 500 may be used to operate the spread spectrum serializer of FIG. 4, the serializer circuit 320 of FIG. 3, or any other feasible circuit.

The operation 500 may begin with receiving a first signal from a control circuit, where the first signal includes control data associated with one or more sensors coupled to the serializer circuit 320 (502). In some implementations, a means for receiving the first signal may include the I/O circuit 304 of FIG. 3 or the processing system 420 executing the signal transmission and reception SW module 431 of FIG. 4.

The operation 500 may proceed with recovering a fixed frequency clock signal and a control signal from the first signal (504). In some implementations, a means for recovering the fixed frequency clock signal and the control signal may include the clock and data recovery circuit 308 of FIG. 3, or the processing system 420 executing the control and clock recovery SW module 432 of FIG. 4.

The operation 500 may proceed with generating a spread spectrum clock signal based on the fixed frequency clock signal (506). In some implementations, a means for generating the spread spectrum clock signal may include the spread spectrum clock generator 314 of FIG. 3, or the processing system 420 executing the spread spectrum clock SW module 433 of FIG. 4.

The operation 500 may proceed with receiving a sensor data signal based at least in part on data captured by the one or more sensors, the spread spectrum clock signal, and the control signal (508). In some implementations, a means for receiving the sensor data signal may include the receiver interface circuit 326 of FIG. 3, or the processing system 420 executing the signal transmission and reception SW module 431 of FIG. 4.

The operation 500 may proceed with retiming the sensor data signal based at least in part on the spread spectrum clock signal and the fixed frequency clock signal (510). In some implementations, a means for retiming the sensor data signal may include the retiming circuit 332 of FIG. 3, or the processing system 420 executing the retiming SW module 434 of FIG. 4.

The operation 500 may proceed with generating an output signal based on the retimed sensor data signal (512). In some implementations, a means for generating the output signal may include the I/O circuit 304 and the PISO 340 of FIG. 3, or the processing system 420 executing the signal transmission and reception SW module 431 of FIG. 4.

In some aspects, the spread spectrum clock signal generated in block 506 has a bounded phase drift. In some aspects, a frequency of the spread spectrum clock signal generated in block 506 follows a triangular or a sawtooth waveform. In some aspects, a frequency of the spread spectrum clock signal generated in block 506 varies by at least a threshold rate. In some aspects, this threshold rate may be specified by a modulation depth of the spread spectrum clock signal corresponding to a percentage frequency variation of the spread spectrum clock signal with respect to a nominal or center frequency of the spread spectrum clock signal.

In some aspects, retiming the sensor data signal in block 510 includes retiming the sensor data signal using a first in first out (FIFO) data buffer.

In some aspects, the one or more sensors include one or more image sensors, and the sensor data includes image data captured by the one or more image sensors. In some aspects, the sensor data signal received in block 508 is received from a sensor data processing circuit and retiming the sensor data signal in block 510 includes receiving a pixel clock signal from the sensor data processing circuit and retiming the sensor data signal based at least in part on the pixel clock signal.

In some aspects, retiming the sensor data signal in block 510 includes generating a recovered clock signal from the sensor data signal, and generating the retimed sensor data signal based at least in part on the recovered clock signal.

In some aspects, the retimed data signal is a parallel data signal, and the output signal is a serial data signal.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

The methods, sequences or algorithms described in connection with the aspects disclosed herein may be embodied directly in hardware, in a software module executed by a processor, or in a combination of the two. A software module may reside in RAM latch, flash latch, ROM latch, EPROM latch, EEPROM latch, registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor.

In the foregoing specification, the example implementations have been described with reference to specific example implementations thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A spread spectrum serializer circuit, comprising:
   a first terminal to receive a first signal from a control circuit and to transmit an output signal to the control circuit;
   a clock and control signal recovery circuit to recover a control signal and a fixed frequency clock signal from the first signal;
   a spread spectrum clock generation circuit to generate a spread spectrum clock signal based on the fixed frequency clock signal;
   a second terminal to receive a sensor data signal from a sensor data processing circuit, the sensor data signal generated based at least in part on the spread spectrum clock signal, the control signal, and data generated by one or more sensors coupled to the sensor data processing circuit;
   a retiming circuit to generate a retimed sensor data signal based at least in part on the sensor data signal and the fixed frequency clock signal; and
   an output data generation circuit to generate the output signal based at least in part on the retimed sensor data signal.

2. The spread spectrum serializer circuit of claim 1, wherein the spread spectrum clock signal has a bounded phase drift.

3. The spread spectrum serializer circuit of claim 2, wherein a frequency of the spread spectrum clock follows a triangular waveform.

4. The spread spectrum serializer circuit of claim 2, wherein a frequency of the spread spectrum clock varies by at least a threshold rate.

5. The spread spectrum serializer circuit of claim 1, wherein the retiming circuit comprises a first in first out (FIFO) data buffer.

6. The spread spectrum serializer circuit of claim 1, wherein the one or more sensors comprise one or more image sensors, and the sensor data signal comprises image data captured by the one or more image sensors.

7. The spread spectrum serializer circuit of claim 6, wherein the retiming circuit generates the retimed sensor data signal based at least in part on a pixel clock signal received from the sensor data processing circuit.

8. The spread spectrum serializer circuit of claim 1, wherein the retiming circuit is configured to generate a recovered clock signal from the sensor data signal and to generate the retimed sensor data signal based at least in part on the recovered clock signal.

9. The spread spectrum serializer circuit of claim 1, wherein the retimed sensor data signal is formatted as a parallel data signal, and wherein the output signal is formatted as a serial data signal.

10. The spread spectrum serializer circuit of claim 1, wherein the first terminal is coupled to the control circuit via a wired data interface.

11. A method for processing signals received from one or more sensors, the method comprising:
    receiving a first signal from a control circuit, the first signal comprising control data associated with the one or more sensors;
    recovering a fixed frequency clock signal and a control signal from the first signal;
    generating a spread spectrum clock signal based on the fixed frequency clock signal;
    receiving a sensor data signal based at least in part on data captured by the one or more sensors, the spread spectrum clock signal, and the control signal;
    retiming the sensor data signal based at least in part on the spread spectrum clock signal and the fixed frequency clock signal; and
    generating an output signal based on the retimed sensor data signal.

12. The method of claim 11, wherein the spread spectrum clock signal has a bounded phase drift.

13. The method of claim 12, wherein a frequency of the spread spectrum clock follows a triangular waveform.

14. The method of claim 12, wherein a frequency of the spread spectrum clock varies by at least a threshold rate.

15. The method of claim 11, wherein retiming the sensor data signal comprises retiming the sensor data signal using a first in first out (FIFO) data buffer.

16. The method of claim 11, wherein the one or more sensors comprise one or more image sensors, and the sensor data signal comprises image data captured by the one or more image sensors.

17. The method of claim 16, further comprising, receiving a pixel clock signal from a sensor data processing circuit, wherein the sensor data signal is received from the sensor data processing circuit, and wherein retiming the sensor data signal is further based at least in part on the pixel clock signal.

18. The method of claim 11, wherein retiming the sensor data signal comprises generating a recovered clock signal from the sensor data signal and generating the retimed sensor data signal based at least in part on the recovered clock signal.

19. The method of claim 11, wherein the retimed sensor data signal is formatted as a parallel data signal, and wherein the output signal is formatted as a serial data signal.

20. A non-transitory computer readable storage medium storing instructions for execution by one or more processors of a spread spectrum serializer circuit, wherein execution of the instructions causes the spread spectrum serializer circuit to perform operations comprising:
    receiving a first signal from a control circuit, the first signal comprising control data associated with the one or more sensors;
    recovering a fixed frequency clock signal and a control signal from the first signal;
    generating a spread spectrum clock signal based on the fixed frequency clock signal;
    receiving a sensor data signal based at least in part on data captured by the one or more sensors, the spread spectrum clock signal, and the control signal;
    retiming the sensor data signal based at least in part on the spread spectrum clock signal and the fixed frequency clock signal; and
    generating an output signal based on the retimed sensor data signal.

* * * * *